(12) United States Patent
Ashbaugh et al.

(10) Patent No.: US 11,466,547 B2
(45) Date of Patent: Oct. 11, 2022

(54) MEASUREMENT GUIDED OSCILLATION DETECTION FOR MOTOR PROTECTION

(71) Applicant: Halliburton Energy Services, Inc., Houston, TX (US)

(72) Inventors: Ryan Bridwell Ashbaugh, Broken Arrow, OK (US); David C. Beck, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 16/669,892

(22) Filed: Oct. 31, 2019

(65) Prior Publication Data

US 2021/0131241 A1 May 6, 2021

(51) Int. Cl.
| | |
|---|---|
| *E21B 43/12* | (2006.01) |
| *H02P 23/04* | (2006.01) |
| *E21B 47/008* | (2012.01) |
| *E21B 41/00* | (2006.01) |

(52) U.S. Cl.
CPC ........ *E21B 43/128* (2013.01); *E21B 41/0092* (2013.01); *E21B 47/008* (2020.05); *H02P 23/04* (2013.01); *H02P 2205/05* (2013.01)

(58) Field of Classification Search
CPC ............................. E21B 47/008; E21B 43/128
See application file for complete search history.

(56) References Cited

U.S. PATENT DOCUMENTS

| | | | |
|---|---|---|---|
| 6,388,416 | B1 | 5/2002 | Nakatani et al. |
| 7,304,452 | B2 | 12/2007 | Nagai et al. |
| 8,339,081 | B2 | 12/2012 | Patel et al. |
| 9,374,028 | B2 | 6/2016 | Nondahl et al. |
| 9,985,565 | B2 | 5/2018 | Royak et al. |
| 2011/0050145 | A1 | 3/2011 | Plitt et al. |

(Continued)

FOREIGN PATENT DOCUMENTS

| | | |
|---|---|---|
| CN | 101567652 B | 7/2012 |
| CN | 104253572 B | 4/2017 |

(Continued)

OTHER PUBLICATIONS

PCT Application Serial No. PCT/US2019/059280, International Search Report, dated Jul. 28, 2020, 4 pages.

(Continued)

*Primary Examiner* — Robert E Fuller
(74) *Attorney, Agent, or Firm* — Delizio, Peacock, Lewin & Guerra

(57) ABSTRACT

Permanent magnet motors (PMMs) can develop oscillations during motor startup that can cause damage to electric submersible pump (ESP) components. A system and method are presented for identifying mechanical and/or electrical caused oscillations in a PMM through the analysis of oscillations in current and torque measurements. A control system within a surface motor controller receives current and/or torque measurements from downhole sensors. The control system employs one or more algorithms designed to detect oscillations in the measurements. Upon detecting oscillations that are consistent with oscillations in the motor from mechanical or electrical causes, the control system automatically initiates protective action to prevent damage to the ESP components.

20 Claims, 4 Drawing Sheets

(56) References Cited

U.S. PATENT DOCUMENTS

2012/0027630 A1     2/2012   Forsberg et al.
2017/0107989 A1     4/2017   Coste
2018/0375456 A1*   12/2018   Huh ..................... E21B 43/128

FOREIGN PATENT DOCUMENTS

| CN | 107994819 A | 5/2018 |
| --- | --- | --- |
| KR | 20090009872 A | 1/2009 |
| WO | 2016094530 A1 | 6/2016 |

OTHER PUBLICATIONS

PCT Application Serial No. PCT/US2019/059280, International Written Opinion, dated Jul. 28, 2020, 7 pages.

* cited by examiner

MEASUREMENT GUIDED OSCILLATION DETECTION FOR MOTOR PROTECTION

BACKGROUND

The disclosure generally relates to the field of data processing and to measuring, calibrating, or testing.

In the oil and gas industry, electric submersible pumps (ESPs) are used for the recovery of oil and gas from subsurface formations. ESPs are often suspended vertically in a wellbore and are connected by a cable to a motor which drives the ESP. Permanent magnet motors (PMMs) are often used in ESP systems because they are more energy efficient than inductive motors and reduce power costs. However, during PMM startup, torsional excitation and disturbances of the electrical systems in the motor may generate an unsteady torque which can lead to oscillations in the motor. These oscillations in the motor can be transferred into the shaft of the ESP causing damage to the long, slender ESP components below the earth's surface. Once the ESP components are damaged, the ESP may need to be removed from the wellbore and replaced.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to a startup and operational protection system as a separate microprocessor system, in illustrative examples. Aspects of this disclosure can be also applied with a startup and operational protection system as a set of software instructions run in a surface controller's processing unit. In other instances, well-known instruction instances, protocols, structures and techniques have not been shown in detail in order not to obfuscate the description.

Overview

When used to drive ESPs, PMMs can develop oscillations during motor startup due to mechanical or electrical phenomena. These oscillations can be visually or audibly detected for a motor on the surface. However, because the ESP string is located beneath the surface of the earth, visual and auditory clues are not available to detect the oscillations, and other methods must be employed to detect and stop the oscillation before damage to the ESP components occurs.

A control system can be programmed to identify mechanical and/or electrical caused oscillations through the analysis of oscillations in current and torque measurements. A control system within a motor controller receives current and/or torque measurements from surface or downhole sensors. The control system includes programming to detect oscillations in the measurements. Upon detecting oscillations that are consistent with oscillations in the motor from mechanical or electrical causes, the control system automatically initiates protective action to prevent damage to the ESP components.

Identifying oscillations occurring in a downhole PMM reduces the potential for damage to an ESP system during startup and restart operations. This can decrease the need to remove the pump early due to motor or pump failure caused by instabilities during starting or operation. Thus, the actual and perceived equipment reliability is increased. Preventing damage to the ESP components reduces costs associated with early removal of the ESP.

Example Illustrations

Figure 1:
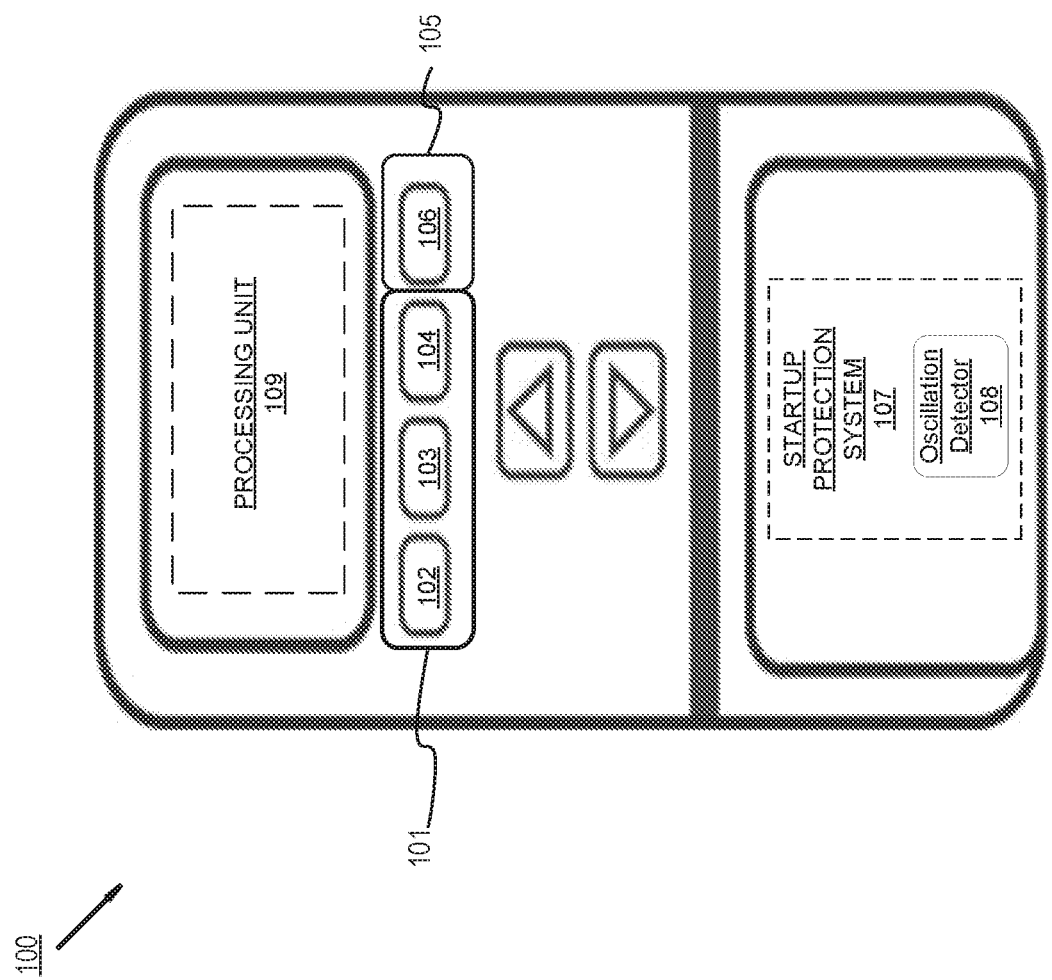
FIG. 1 depicts a surface motor control system for detecting oscillations in a PMM.

FIG. 1 depicts a surface motor control system for detecting oscillations in a PMM. Oscillations in a PMM are most likely to occur during initial startup of the motor. These oscillations can be caused by an inconsistent application of power, poor connections between the power supply and motor, or improper power settings for the motor. Oscillations that occur during startup propagate throughout the ESP shaft and can cause damage to the shaft and other components of the ESP. Detecting and mitigating oscillations that occur during startup using a surface motor control system protects the ESP assembly from potential damage due to the PMM oscillations. A surface motor controller 100 controls a downhole PMM through an application of power to the PMM. The surface motor controller 100 supplies power to the PMM to start the motor and terminates power to the PMM to stop the motor. The surface motor controller 100 can also alter operational parameters of the motor by changing electrical quantities of the electrical power supplied. For example, the surface motor controller 100 may alter the voltage to the motor to control the speed of the motor.

A surface controller instrument 101 measures electrical quantities of the power supplied to the PMM and provides these electrical quantities (e.g., current and voltage measurements) to the surface motor controller 100. While depicted as a single instrument capable of multiple types of electrical quantity measurements, the surface controller instrument 101 may also be comprised of multiple instruments, each measuring a distinct electrical quantity of the power supplied. The instrument 101 generates the measurements as time series data including current data 102, voltage data 103, and other electrical quantity data 104. Examples of electrical quantity data may include efficiency, reliability, and/or electromagnetic interference. A downhole communication system communicates downhole data from downhole sensors to a communication receiver 105 within the surface motor controller 100. The communication receiver 105 receives data from the downhole communication system. The downhole communication system may be coupled to the communication receiver through a wired connection or other connection with the surface motor controller 100. The downhole data includes shaft torque data 106. The electrical data (102-104) and shaft torque data 106 are input into the startup protection system 107. The startup protection system 107 is a microprocessor system capable of running algorithms. While depicted as a separate system from the processing unit 109, the startup protection system may also be of a processing unit 109 of the surface motor controller 100.

The startup protection system 107 employs an oscillation detector 108 to process the electrical data 102-104 and the shaft torque data 106. The oscillation detector 108 analyzes the data to detect oscillations in the data consistent with unstable operation of a PMM. Unstable operation of a PMM can be determined by analyzing current signatures. Unstable operation of the PMM results in oscillations, or spikes, in the current data 102 and shaft torque data 106. Torsional oscillations in a PMM introduce variations in rotor speed that may introduce lower and upper sidebands in the current data 102. The speed variations also lead to irregular rotation of the shaft torque as the ESP periodically accelerates and decelerates. Variations in torque values of the shaft torque data 106 can be an indication of torsional oscillation in a PMM.

Upon detecting oscillations in the data consistent with instabilities in the PMM, the startup protection system 107 directs the processing unit 109 of the surface motor controller 100 to change the operational parameters of the PMM. The startup protection system may direct the processing unit 109 to either stop the motor or adjust the operational parameters of the PMM. To stop the motor, the processing unit 109 sends a control command to a power supply to discontinue supplying power to the PMM. The power supply may be part of the surface motor controller 100 or it may be a separate unit controlled by the surface motor controller. The processing unit 109 may also adjust the operating parameters of the PMM by adjusting the voltage to mitigate instability.

Figure 2:
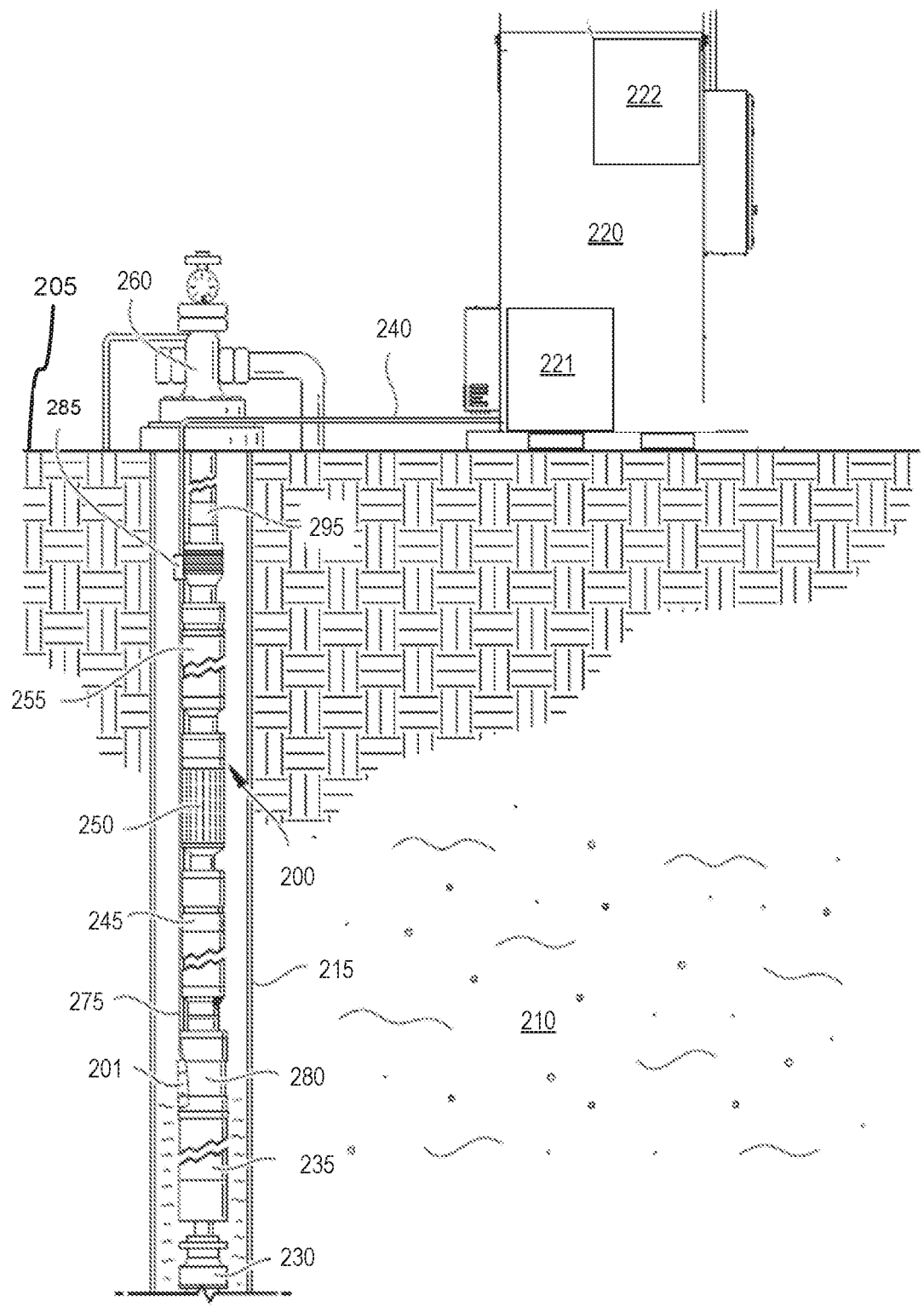
FIG. 2 depicts an electric submersible pump assembly with a protected measurement guided oscillation detection motor control system.

FIG. 2 depicts an electric submersible pump assembly with a protected measurement guided oscillation detection motor control system. An ESP assembly 200 is located downhole in a well below a surface 205. The well may be several hundred to a few thousand meters deep. The ESP assembly 200 is depicted vertically but may be a different orientation/arrangement depending on well direction (e.g., horizontal, bent, curved, etc.). The well may be an oil well, water well, and/or well containing other hydrocarbons, such as natural gas, and/or another production fluid taken from an underground formation 210. A well casing 215 separates the ESP assembly 200 from the underground formation 210. Production fluid enters the well casing 215 through casing perforations (not shown) below an ESP intake 250. The ESP assembly 200 further includes, from bottom to top, a downhole gauge 230 which includes one or more sensors that can detect and provide information such as motor speed, current, torque and/or other operating conditions to a user interface, variable speed drive controller, and/or data collection computer, herein individually or collectively referred to as controller 260, on the surface 205. An ESP motor 235 comprises a permanent magnet motor. An ESP cable 240 provides power to the ESP motor 235. The ESP cable 240 is also configured to carry data to and/or from the downhole gauge 230 to the surface 205.

At the surface 205, the ESP cable 240 is connected to a surface motor controller 220, which may be a variable speed drive. Within the surface motor controller 220 are measurement instruments 221 and a startup protection system 222. The instruments 221 include at least instruments capable of measuring current and/or torque. The startup protection system 222 runs instructions on a microprocessor.

Upstream of the ESP motor 235 is a motor protector 245, an ESP intake 250, an ESP pump 255, and a production tubing 295. The motor protector 245 serves to equalize pressure and keep the motor oil separate from well fluid. The ESP intake 250 serves as the intake to the ESP pump 255 and may include intake ports and/or a slotted screen. The ESP pump 255 comprises a multi-stage centrifugal pump including stacked impeller and diffuser stages. Other components of ESP assemblies may also be included in the ESP assembly 200, such as a tandem charge pump (not shown) or gas separator (not shown) located between the ESP pump 255 and the ESP intake 250 and/or a gas separator that may serve as the pump intake. Shafts of the ESP motor 235, the motor protector 245, the ESP intake 250 and the ESP pump 255 are connected together (i.e., splined) and rotated by the ESP motor 235. The production tubing 295 may carry lifted fluid from the discharge of the ESP pump 255 toward a wellhead 265.

The ESP cable 240 extends from the surface motor controller 220 at the surface 205 to a motor lead extension (MLE) 275. A cable connection 285 connects the ESP cable 240 to the MLE 275. The MLE 275 may plug in, tape in, spline in or otherwise electrically connect the ESP cable 240 to the ESP motor 235 to provide power to the ESP motor 235. A pothead 201 encloses the electrical connection between the MLE 275 and a head 280 of the ESP motor 235.

Figure 3:
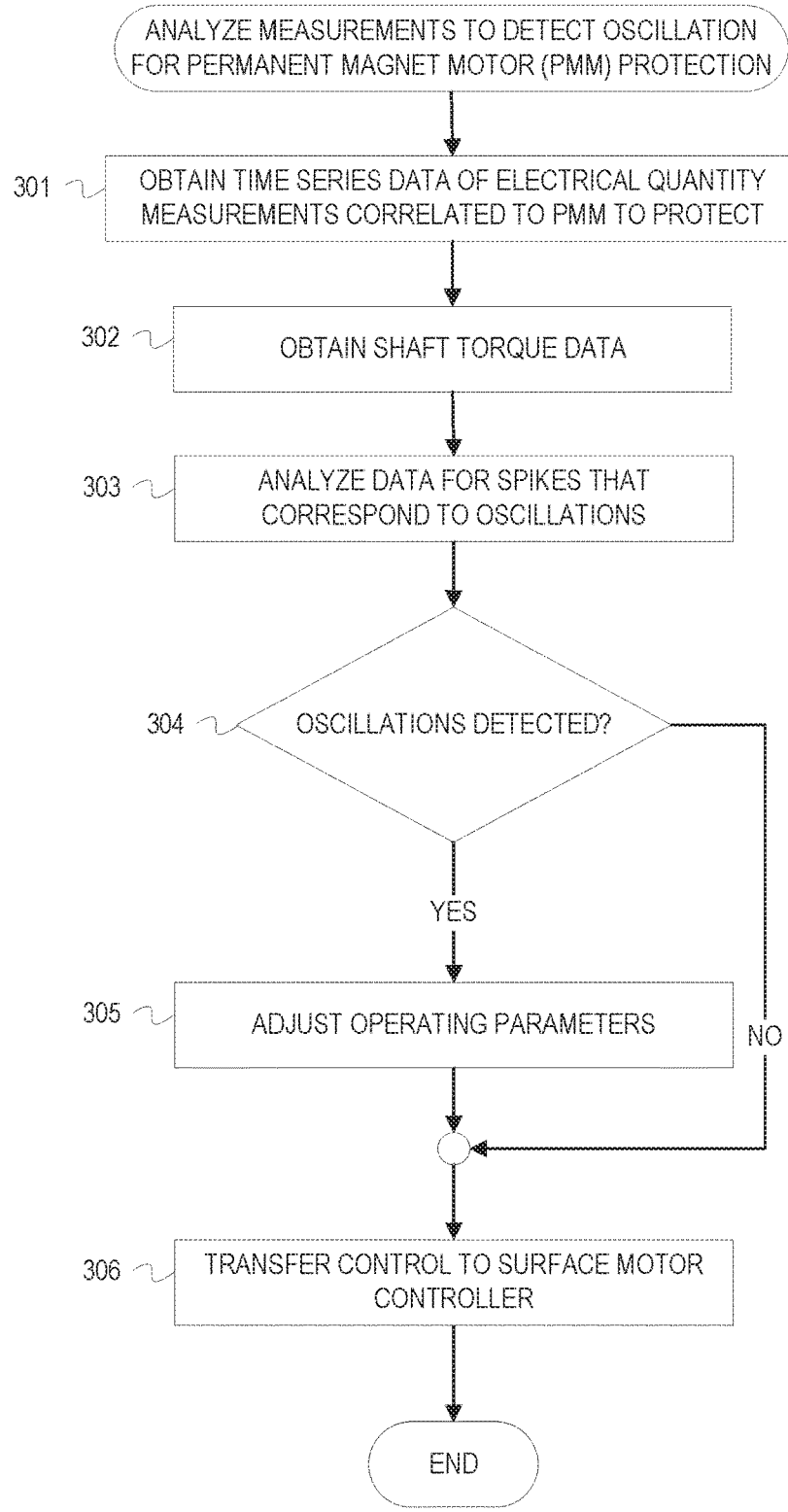
FIG. 3 depicts a flowchart of operations for PMM oscillation detection.

FIG. 3 depicts a flowchart of example operations for measurement guided PMM oscillation detection. At least some of the operations can be performed by a processor executing program code or instructions. The description refers to the program code that performs some of the operations as a "startup protection system" although it is appreciated that program code naming and organization can be arbitrary, language dependent, and/or platform dependent. Operations of the flowchart of FIG. 3 start at block 301.

At block 301, a startup and operational protection system ("startup protection system") obtains time series data from a surface motor controller of a PMM being protected. Surface controller instruments in the surface motor controller measure electrical quantities of the power supplied to the PMM. The electrical quantity measurements can include input and output voltage, current, efficiency of power conversion, voltage stability, operating temperature, and other electrical parameters. These electrical quantities vary with time throughout operation.

At block 302, the startup protection system obtains shaft torque data. A downhole sensor measures torque in the ESP shaft. The ESP shaft transmits the torque produced by the PMM to keep rotating components of the ESP aligned. Thus, oscillations in the shaft torque data correlate to oscillations in the PMM. A downhole communications system communicates the shaft torque data from the downhole sensors to the surface motor controller from which the startup protection system obtains the shaft torque data.

At block 303, the startup protection system analyzes the time series electrical quantity measurements data to detect related correlated variations in the data. The startup protection system includes a program with a module to track electrical quantity measurement variations. The startup protection system monitors the time series data and shaft torque data throughout operation. The time series data and shaft torque data are used as input variables for one or more oscillation detection algorithms of the startup protection system to identify correlated variations in the data. The oscillation detection algorithms may include, but are not limited to, algorithms utilizing differential analysis methods, Fourier analysis methods, wavelet transform methods, or neural networks.

During perfectly stable PMM operation, the current signature is a sinusoidal wave. However, during normal operation, harmonics in the current data are typically present. Instability in the PMM contributes to additional sideband harmonics. The flow of harmonic currents creates voltage harmonics, which can distort the power supply voltage. The torque of a motor is proportional to the motor current, and the angular velocity of the rotor is proportional to the voltage. Thus, the torque in the motor, and the torque transferred to the shaft, will experience oscillations proportional to the magnitude of the variation of the sideband from the natural frequency of the current. The startup protection system executes one or more programs that analyze the data to identify correlations between the data sets.

At block 304, the startup protection system determines whether there are oscillations in the PMM that likely correlate to unstable operation based on the analysis. Variations in any one set of the data (e.g. current data, voltage data, or shaft torque data) are likely to occur naturally during startup and operation. Minor variations in the measured data due to standard operation of a PMM tend to equalize quickly and do not impact the other data sets. However, larger variations consistent between the data sets are indicative of oscillations in the PMM due to PMM instability. To account for these minor variations, a threshold(s) can be defined to distinguish acceptable oscillations from those that will likely contribute to unstable operation. The threshold effectively operates as a boundary between low confidence and high confidence that the detected oscillations in the measurements correspond to unstable or problematic operation of the PMM. In addition, the threshold(s) is tailored to characteristics of the PMM and ESP assembly. Different materials and configurations will affect the transfer of PMM oscillations to the shaft. Upon detecting correlated variations in the data sets, the startup protection system provides an indication of occurring oscillations in the PMM. If the startup protection system does not detect oscillations based on the analysis, the process proceeds to block 306. If the startup protection system detects oscillations occurring in the PMM, the process proceeds to block 305.

At block 305, the startup protection system initiates operational procedures to adjust operating parameters. Upon detection of oscillations in the PMM, the startup protection system directs a processing unit of the surface motor controller to adjust the operating parameters. Adjusting the operation parameters may involve shutting down the PMM by terminating the power supply. While the PMM is shut down, the startup protection system adjusts the operating parameters. From the initial startup parameters, such as initial voltage, the startup protection system adjusts the initial starting parameters to a given percent difference. The percent difference may be higher or lower than the initial starting parameters and may be determined by expert knowledge or through adaptive program code. The adjustments may also be live adjustments made by initialing the adaptive program code without shutting down the PMM. Adjusting the operation parameters may be based on criteria specific to each measured quantity. The criteria for adjustment may be a threshold value for instability corresponding to each measured electrical quantity.

At block 306, the startup protection system transfers operational control to the surface motor controller. After restarting the PMM, or while the PMM is still shut down after the operational adjustments have been made but prior to restart, the startup protection system returns control of the ESP system to the surface motor controller's processing unit. The surface motor controller initiates standard operational procedures. The process may be repeated to determine if oscillations in the PMM are still occurring after adjustment of the operational parameters and restart.

While FIG. 3 depicts an example embodiment for detecting oscillations in a PMM, embodiments can differ. In some embodiments, the system may omit a downhole sensor and operate only on measured electrical quantities of the power supplied to the PMM. In this instance, software in a variable speed drive calculates shaft torque data from the power characteristics. In other embodiments, the system may also include audio or fiber optic sensors to detect oscillations through sound waves or vibration caused by mechanical phenomena. Moreover, embodiments can implement different levels or degrees of adjustments to operational parameters of the power supply. Thresholds can be used to define ranges of oscillations in terms of at least one of frequency and magnitude that map to different levels of adjustment depending on perceived or inferred severity of the torsional oscillation.

Figure 4:
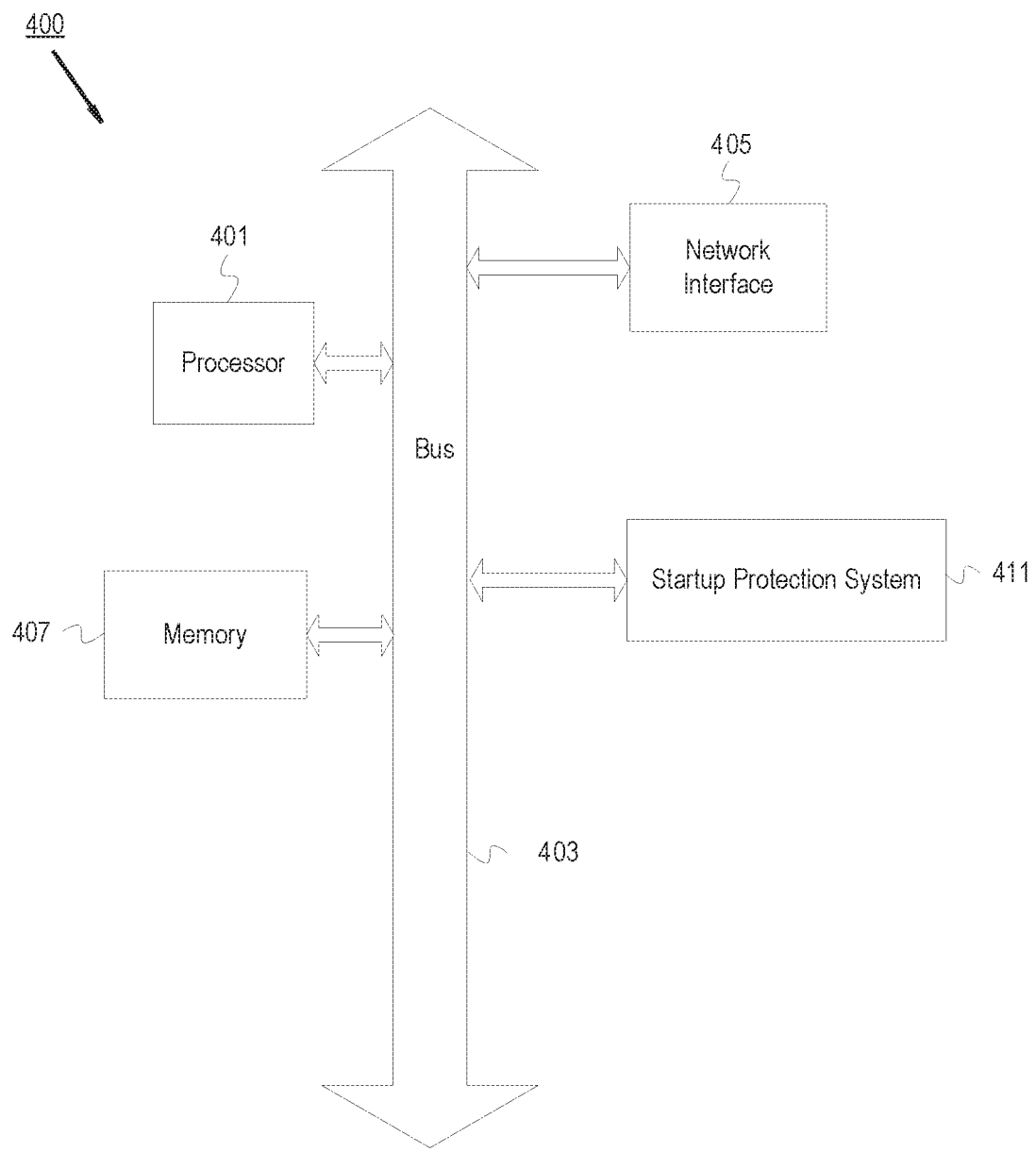
FIG. 4 depicts an example computer, according to some embodiments.

FIG. 4 depicts an example computer, according to some embodiments. The computer 400 includes a processor 401 (possibly including multiple processors, multiple cores, multiple nodes, and/or implementing multi-threading, etc.). The computer 400 includes memory 407. The memory 407 may comprise system memory, or any one or more of the above already described possible realizations of machine-readable media. The computer 400 also includes a bus 403 and a network interface 405. In some embodiments, the network interface 405 may comprise a wireless network interface to communicate data and its status to other wireless devices in the vicinity. In some embodiments, the computer 400 can include a separate microcontroller, perhaps as part of the startup protection system 411. The microcontroller can include different types of machine-readable media. For example, the microcontroller can include embedded memory to store its program and data along with random access memory.

The computer 400 thus includes a startup protection system 411. The startup protection system 411 can perform oscillation detection operations, as described above. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for detecting oscillations in permanent motor magnets as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

A method comprises obtaining time-series first electrical quantity data for power supplied from a power supply to a permanent magnet motor (PMM) in an electric submersible pump (ESP) system, determining whether oscillations are detected in the time-series first electrical quantity data, and adjusting the power supplied to the PMM based, at least partly, on detection of oscillations in the time-series first electrical quantity data. The method further comprises obtaining time-series shaft torque data from a downhole sensor and determining whether oscillations are detected in the time-series shaft torque data. Adjusting the power supplied to the PMM is also based on a determination that oscillations are detected in the time-series shaft torque data. The method further comprises obtaining time-series second electrical quantity data for the power supplied to the PMM and determining whether oscillations are detected in the time-series second electrical quantity data. Adjusting the power supplied to the PMM is also based on a determination that oscillations are detected in the time-series second electrical quantity data. Determining whether oscillations are detected in the first electrical quantity measurements comprises inputting the first electrical quantity measurements into an oscillation detection algorithm. Adjusting the power supplied to the PMM comprises terminating the power supplied to the PMM, adjusting an operational parameter of the power supply, or terminating the power supplied to the PMM and adjusting a startup operational parameter of the power supply that is applied when the power supply resumes supplying power to the PMM. The first electrical quantity is current or voltage. The method further comprises determining whether detected oscillations satisfy a threshold corresponding to unstable operation of the PMM of the ESP. Adjusting the power supplied to the PMM is also based on a determination that the detected oscillations satisfy the threshold.

A system comprises an ESP comprising a PMM and an ESP shaft, a power supply, a cable that transmits power from power supply to the PMM, and a surface motor controller having at least a first instrument that measures over time a first electrical quantity of power supplied to the PMM from the power supply. The system further comprises a processor and a machine-readable medium having instructions stored thereon that are executable by the processor to cause the surface motor controller to analyze first electrical quantity measurements by the first instrument to detect oscillations in the electrical quantity measurements. Based on detection of oscillations in the electrical quantity measurements, the instructions further cause the surface motor controller to determine whether the detected oscillations correspond to instability in the PMM and adjust the power supply to mitigate the instability. The instructions to determine whether the detected oscillations correspond to instability in the PMM comprise instructions executable by the processor to cause the surface motor controller to determine whether the detected oscillations satisfy an oscillation threshold that corresponds to instability in the PMM. The system further comprises a downhole sensor that measures over time a shaft torque. The instructions further cause the surface motor controller to analyze the shaft torque measurements to detect oscillations in the shaft torque. The instructions to adjust the power supply to mitigate instability are also based on a determination that oscillations are detected in the shaft torque. The system further comprises at least a second instrument that measures over time a second electrical quantity of power supplied to the PMM from the power supply. The system further comprises instructions to cause the surface motor controller to analyze second electrical quantity measurements by the second instrument to detect oscillations in the second electrical quantity measurements and, based on detection of oscillations in the second electrical quantity measurements, determine whether the detected oscillations correspond to instability in the PMM. The instructions to adjust the power supply to mitigate the instability are also based on a determination that oscillations are detected in the second electrical quantity measurements.

A non-transitory, computer-readable medium having instructions stored thereon that are executable by a computing device to perform operations comprises obtaining time-series first electrical quantity data for power supplied from a power supply to a permanent magnet motor (PMM) in an electric submersible pump (ESP) system, determining whether oscillations are detected in the time-series first electrical quantity data, and adjusting the power supplied to the PMM based, at least partly, on detection of oscillations in the time-series first electrical quantity data. The non-transitory, computer-readable medium further comprises instructions to perform operations comprising obtaining time-series shaft torque data from a downhole sensor and determining whether oscillations are detected in the time-series shaft torque data. Adjusting the power supplied to the PMM is also based on a determination that oscillations are detected in the time-series shaft torque data. The non-transitory, computer-readable medium further comprises instructions to perform operations comprising obtaining time-series second electrical quantity data for the power supplied to the PMM and determining whether oscillations are detected in the time-series second electrical quantity data. Adjusting the power supplied to the PMM is also based on a determination that oscillations are detected in the time-series second electrical quantity data. Determining whether oscillations are detected in the first electrical quantity measurements comprises inputting the first electrical quantity measurements into an oscillation detection algorithm. Adjusting the power supplied to the PMM comprises terminating the power supplied to the PMM, adjusting an operational parameter of the power supply, or terminating the power supplied to the PMM and adjusting a startup operational parameter of the power supply that is applied when the power supply resumes supplying power to the PMM. The first electrical quantity is current or voltage. The non-transitory, computer-readable medium further comprises instructions to perform operations comprising determining whether detected oscillations satisfy a threshold corresponding to unstable operation of the PMM of the ESP. Adjusting the power supplied to the PMM is also based on a determination that the detected oscillations satisfy the threshold.

What is claimed is:

1. A method comprising:
   obtaining time-series first electrical quantity data for power supplied from a power supply to a permanent magnet motor (PMM) in an electric submersible pump (ESP) system;
   determining a threshold defining unacceptable oscillations in the time-series first electrical quantity data based, at least partly, on materials of the ESP;
   detecting unacceptable oscillations in the time-series first electrical quantity data; and
   adjusting the power supplied to the PMM based, at least partly, on the detection of unacceptable oscillations in the time-series first electrical quantity data,
   wherein adjusting the power supplied to the PMM comprises terminating the power supplied to the PMM and adjusting a startup electrical quantity of the power supply that is applied when the power supply resumes supplying the power to the PMM.

2. The method of claim 1, further comprising:
   detecting unacceptable oscillations in time-series shaft torque data; and
   correlating the detected unacceptable oscillations in the time-series shaft torque data to the detected unacceptable oscillations in the time-series first electrical quantity data,
   wherein adjusting the power supplied to the PMM is also based on a determination that correlated unacceptable oscillations are detected in the time-series first electrical quantity data and the time-series shaft torque data.

3. The method of claim 1, further comprising:
   obtaining time-series second electrical quantity data for the power supplied to the PMM; and
   detecting unacceptable oscillations in the time-series second electrical quantity data,
   wherein adjusting the power supplied to the PMM is also based on a determination that unacceptable oscillations are detected in the time-series second electrical quantity data.

4. The method of claim 1, wherein detecting the unacceptable oscillations in the time-series first electrical quantity data comprises inputting the first electrical quantity data into an oscillation detection algorithm.

5. The method of claim 1, wherein adjusting the power supplied to the PMM comprises adjusting an operational parameter of the power supply.

6. The method of claim 1, wherein the first electrical quantity data comprises current data or voltage data.

7. The method of claim 1, further comprising determining whether detected oscillations satisfy a threshold corresponding to unstable operation of the ESP, wherein adjusting the power supplied to the PMM is also based on a determination that the detected oscillations satisfy the threshold.

8. The method of claim 1, wherein the threshold defining the unacceptable oscillations comprises a range of oscillations of at least one of frequency and magnitude that map to different levels of adjustment.

9. The method of claim 1, wherein adjusting the power supplied to the PMM occurs during a startup sequence of the PMM.

10. A system comprising:
an electric submersible pump (ESP) comprising a permanent magnet motor (PMM) and an ESP shaft;
a power supply;
a cable that transmits power from the power supply to the PMM; and
a surface motor controller having,
a first instrument takes first measurements over time of a first electrical quantity of power supplied to the PMM from the power supply;
a processor; and
a machine-readable medium having instructions stored thereon that are executable by the processor to cause the surface motor controller to,
analyze first electrical quantity measurements by the first instrument to detect unacceptable oscillations in the first measurements;
determine a threshold to define the unacceptable oscillations in the first measurements based, at least partly, on materials of the ESP;
based on the detection of the unacceptable oscillations in the first measurements, determine that the detected unacceptable oscillations exceed the threshold corresponding to instability; and
adjust, based on the threshold, the power supply to mitigate the instability, wherein the instructions to adjust the power supply to mitigate the instability comprise instructions to terminate the power supply to the PMM and adjust a startup electrical quantity of the power supply that is applied when the supply of power resumes to the PMM.

11. The system of claim 10, wherein the instructions further cause the surface motor controller to:
analyze shaft torque measurements to detect unacceptable oscillations in the shaft torque measurements; and
correlate the detected unacceptable oscillations in the shaft torque measurements to the detected unacceptable oscillations in the first measurements,
wherein the instructions to adjust the power supply to mitigate instability is also based on the correlated unacceptable oscillations detected in the first measurements and in the shaft torque measurements.

12. The system of claim 10, further comprising a second instrument that measures over time second electrical quantity measurements of power supplied to the PMM from the power supply.

13. The system of claim 12, wherein the machine-readable medium further comprises instructions executable by the processor to cause the surface motor controller to:
analyze the second electrical quantity measurements by the second instrument to detect oscillations in the second electrical quantity measurements;
determine a threshold to define the oscillations in the second electrical quantity measurements as being unacceptable based, at least partly, on materials of the ESP; and
based on detection of unacceptable oscillations in the second electrical quantity measurements, determine that the detected unacceptable oscillations exceed the threshold corresponding to instability in the system,
wherein the instructions to adjust the power supply to mitigate the instability are also based on the determination that the detected unacceptable oscillations exceed the threshold.

14. A non-transitory, computer-readable medium having instructions stored thereon that are executable by a computing device to:
obtain time-series first electrical quantity data for power supplied from a power supply to a permanent magnet motor (PMM) in an electric submersible pump (ESP) system;
determine a threshold defining unacceptable oscillations in the time-series first electrical quantity data based, at least partly, on materials of the ESP;
detect unacceptable oscillations in the time-series first electrical quantity data; and
adjust the power supplied to the PMM based, at least partly, on the detection of unacceptable oscillations in the time-series first electrical quantity data, wherein the adjustment of the power supplied to the PMM comprises a termination of the power supplied to the PMM and an adjustment of a startup electrical quantity of the power supply that is applied when the power supply resumes the supply of power to the PMM.

15. The non-transitory, computer-readable medium of claim 14, further comprising instructions to:
calculate time-series shaft torque data from at least one of the time-series first electrical quantity data and a time-series second electrical quantity data; and
based on a detection of unacceptable oscillations in the time-series shaft torque data, correlate the unacceptable oscillations detected in the time-series shaft torque data to the detected unacceptable oscillations in the time-series first electrical quantity data,
wherein the adjustment of the power supplied to the PMM is also based on the correlated unacceptable oscillations detected in the time-series first electrical quantity data and the time-series shaft torque data.

16. The non-transitory, computer-readable medium of claim 14, further comprising instructions to:
obtain time-series second electrical quantity data for the power supplied to the PMM;
determine a threshold defining unacceptable oscillations in the time-series second electrical quantity data based, at least partly, on materials of the ESP; and
detect unacceptable oscillations in the time-series second electrical quantity data,
wherein the adjustment of the power supplied to the PMM is also based on a determination that unacceptable oscillations are detected in the time-series second electrical quantity data and the time-series first electrical quantity data.

17. The non-transitory, computer-readable medium of claim 14, wherein the detection of the unacceptable oscillations in the time-series first electrical quantity data comprises an input of the first electrical quantity data into an oscillation detection algorithm.

18. The non-transitory, computer-readable medium of claim 14, wherein the adjustment of the power supplied to the PMM comprises an adjustment of an operational parameter of the power supply.

19. The non-transitory, computer-readable medium of claim 14, wherein the first electrical quantity data comprises current data or voltage data.

20. The non-transitory, computer-readable medium of claim 14, wherein the threshold defining the unacceptable oscillations comprises a range of oscillations of at least one of frequency and magnitude that map to different levels of adjustment.

* * * * *